US012240655B2

(12) United States Patent
Duman et al.

(10) Patent No.: US 12,240,655 B2
(45) Date of Patent: Mar. 4, 2025

(54) LID FOR DISPENSING MEASURED POWDER AMOUNTS

(71) Applicants: Goktug Duman, Miami, FL (US); Jorge Luis Garcia, Plantation, FL (US)

(72) Inventors: Goktug Duman, Miami, FL (US); Jorge Luis Garcia, Plantation, FL (US)

(*) Notice: Subject to any disclaimer, the term of this patent is extended or adjusted under 35 U.S.C. 154(b) by 57 days.

(21) Appl. No.: 18/296,127

(22) Filed: Apr. 5, 2023

(65) Prior Publication Data

US 2023/0331437 A1  Oct. 19, 2023

Related U.S. Application Data

(60) Provisional application No. 63/331,062, filed on Apr. 14, 2022.

(51) Int. Cl.
*B65D 25/52* (2006.01)
*B65D 47/26* (2006.01)
(Continued)

(52) U.S. Cl.
CPC .......... *B65D 25/52* (2013.01); *B65D 47/265* (2013.01)

(58) Field of Classification Search
CPC .......... B65D 1/00; B65D 1/02; B65D 1/0223; B65D 1/023; B65D 1/0238; B65D 1/0246; B65D 1/0276; B65D 1/0284; B65D 1/04; B65D 1/06; B65D 1/08; B65D 1/09; B65D 1/095; B65D 1/10; B65D 1/16; B65D 1/20; B65D 1/22; B65D 1/30; B65D 1/32; B65D 1/323; B65D 1/36; B65D 1/44; B65D 11/02; B65D 11/04; B65D 11/16; B65D 11/20; B65D 11/26; B65D 17/02; B65D 17/34; B65D 17/4011; B65D 17/4012; B65D 17/4014; B65D 17/464; B65D 17/501; B65D 17/502; B65D 21/02; B65D 21/0204; B65D 21/0213; B65D 21/022; B65D 21/0223; B65D 21/0231;
(Continued)

(56) References Cited

U.S. PATENT DOCUMENTS 10,058,484 B2 * 8/2018 Battle ................... A61J 7/0046
10,976,189 B1 * 4/2021 Matusek ............ B65D 47/0885
(Continued)

FOREIGN PATENT DOCUMENTS

CA        2605597 A1 *  4/2009   ........... B65D 47/283
CN     112978099 A  *  6/2021   ............. B65D 83/06
WO  WO-2019147331 A1 *  8/2019   ............. G01F 11/24

*Primary Examiner* — Anthony D Stashick
*Assistant Examiner* — Marcos Javier Rodriguez Molina
(74) *Attorney, Agent, or Firm* — Dunlap Bennett & Ludwig, PLLC

(57) ABSTRACT

A dispensing lid assembly having a lid portion that seals off the opening of the container but for an aperture and a centrally disposed interface void. The lid portion provides an integrated, external measuring spout in communication with the aperture. A dial portion may be rotatably coupled to the lid portion so that they rotate independent of each other. The dial portion is operatively associated with a diaphragm disposed under the lid portion so that rotation of the dial portion selectively moves the diaphragm between an open configuration and a closed configuration closing off the aperture and fluidly disconnecting the compartment of the container from the external measuring spout.

13 Claims, 3 Drawing Sheets

(51) Int. Cl.
*B65D 47/08* (2006.01)
*B65D 83/06* (2006.01)
*G01F 11/24* (2006.01)
*G01F 11/26* (2006.01)

(58) Field of Classification Search
CPC ............ B65D 21/0233; B65D 21/0237; B65D
2203/00; B65D 2203/02; B65D 2203/04;
B65D 2203/06; B65D 2215/02; B65D
2217/00; B65D 2251/0003; B65D
2251/0015; B65D 2251/0018; B65D
2251/0021; B65D 2251/0025; B65D
2251/0028; B65D 2251/0031; B65D
2251/0046; B65D 2251/005; B65D
2251/0056; B65D 2251/0071; B65D
2251/0078; B65D 2251/0081; B65D
2251/0087; B65D 2251/009; B65D
2251/0093; B65D 2251/0096; B65D
2251/02; B65D 2251/026; B65D 2251/04;
B65D 2251/1016; B65D 2251/105; B65D
2251/1058; B65D 2251/1075; B65D
2251/20; B65D 2255/20; B65D 23/003;
B65D 23/02; B65D 23/04; B65D 23/06;
B65D 23/0828; B65D 23/085; B65D
23/10; B65D 23/102; B65D 23/12; B65D
23/14; B65D 2303/00; B65D 2313/04;
B65D 2401/00; B65D 2401/05; B65D
2401/10; B65D 2401/15; B65D 2401/20;
B65D 2401/25; B65D 2401/45; B65D
2401/50; B65D 25/02; B65D 25/04;
B65D 25/08; B65D 25/082; B65D
25/085; B65D 25/10; B65D 25/14;
25/20; B65D 25/205; B65D 25/24; B65D
25/2802; B65D 25/2823; B65D 25/2882;
B65D 25/2885; B65D 25/2897; B65D
25/32; B65D 25/38; B65D 25/40; B65D
25/42; B65D 25/48; B65D 25/52; B65D
25/525; B65D 25/54; B65D 25/56; B65D
2501/0036; B65D 2517/0014; B65D
2517/0016; B65D 2517/0032; B65D
2517/004; B65D 2517/0041; B65D
2517/0044; B65D 2517/0094; B65D
2517/5091; B65D 2525/285; B65D
2539/003; B65D 2543/00027; B65D
2543/00046; B65D 2543/00055; B65D
2543/00092; B65D 2543/00101; B65D
2543/00148; B65D 2543/00175; B65D
2543/00194; B65D 2543/0024; B65D
2543/00296; B65D 2543/00351; B65D
2543/00435; B65D 2543/00518; B65D
2543/00527; B65D 2543/00537; B65D
2543/00555; B65D 2543/00564; B65D
2543/00574; B65D 2543/00638; B65D
2543/00648; B65D 2543/00657; B65D
2543/00685; B65D 2543/00694; B65D
2543/0074; B65D 2543/00759; B65D
2543/00796; B65D 2543/00805; B65D
2543/00833; B65D 2543/00842; B65D
2543/00888; B65D 2543/00972; B65D
2543/0099; B65D 2547/063; B65D
2547/066; B65D 2575/3227; B65D
2575/583; B65D 2575/586; B65D
2577/205; B65D 2577/2066; B65D
2577/2083; B65D 2581/3422; B65D
2581/3433; B65D 2583/005; B65D
2583/04; B65D 2583/0413; B65D
2583/0422; B65D 2583/0472; B65D
2583/0481; B65D 2590/662; B65D 3/06;
B65D 3/12; B65D 3/20; B65D 3/22;
B65D 3/28; B65D 33/02; B65D 33/14;
B65D 33/16; B65D 33/1666; B65D
35/02; B65D 35/08; B65D 35/10; B65D
35/12; B65D 35/20; B65D 35/22; B65D
35/242; B65D 35/245; B65D 35/28;
B65D 35/36; B65D 35/38; B65D 35/40;
B65D 35/44; B65D 35/46; B65D 35/56;
B65D 39/00; B65D 39/0035; B65D
39/04; B65D 39/08; B65D 41/00; B65D
41/02; B65D 41/023; B65D 41/04; B65D
41/0407; B65D 41/0414; B65D 41/0421;
B65D 41/0442; B65D 41/0471; B65D
41/0485; B65D 41/06; B65D 41/16;
B65D 41/17; B65D 41/20; B65D 41/26;
B65D 41/265; B65D 41/32; B65D 41/34;
B65D 41/3409; B65D 41/3428; B65D
41/3447; B65D 41/46; B65D 41/56;
B65D 43/02; B65D 43/0202; B65D
43/0204; B65D 43/0212; B65D 43/0218;
B65D 43/0225; B65D 43/0235; B65D
43/0268; B65D 43/12; B65D 43/14;
B65D 43/16; B65D 43/162; B65D
43/163; B65D 43/169; B65D 43/18;
B65D 43/22; B65D 43/26; B65D 43/265;
B65D 43/267; B65D 45/16; B65D 45/32;
B65D 45/34; B65D 47/00; B65D 47/02;
B65D 47/04; B65D 47/043; B65D
47/046; B65D 47/06; B65D 47/061;
B65D 47/063; B65D 47/065; B65D
47/08; B65D 47/0804; B65D 47/0809;
B65D 47/0814; B65D 47/0823; B65D
47/0833; B65D 47/0838; B65D 47/0842;
B65D 47/0847; B65D 47/0852; B65D
47/0866; B65D 47/088; B65D 47/0885;
B65D 47/089; B65D 47/0895; B65D
47/10; B65D 47/103; B65D 47/12; B65D
47/121; B65D 47/122; B65D 47/123;
B65D 47/126; B65D 47/141; B65D
47/142; B65D 47/148; B65D 47/18;
B65D 47/20; B65D 47/2006; B65D
47/2012; B65D 47/2018; B65D 47/2025;
B65D 47/2031; B65D 47/2043; B65D
47/2062; B65D 47/2068; B65D 47/2075;
B65D 47/2081; B65D 47/2087; B65D
47/2093; B65D 47/241; B65D 47/242;
B65D 47/243; B65D 47/244; B65D
47/247; B65D 47/248; B65D 47/249;
B65D 47/26; B65D 47/261; B65D
47/263; B65D 47/265; B65D 47/266;
B65D 47/28; B65D 47/286; B65D 47/30;
B65D 4/305; B65D 47/32; B65D 47/36;
B65D 47/38; B65D 47/40; B65D 47/42;
B65D 47/44; B65D 49/00; B65D 49/12;
B65D 5/0227; B65D 5/06; B65D 5/38;
B65D 5/4204; B65D 5/5028; B65D
5/5405; B65D 5/5485; B65D 5/64; B65D
5/6685; B65D 5/68; B65D 5/708; B65D
5/72; B65D 5/722; B65D 5/725; B65D
5/727; B65D 5/728; B65D 5/74; B65D
5/744; B65D 5/745; B65D 5/746; B65D
5/748; B65D 5/76; B65D 50/00; B65D 50/02; B65D 50/04; B65D 50/045; B65D
50/046; B65D 50/06; B65D 50/067;
B65D 51/00; B65D 51/002; B65D 51/04;
B65D 51/145; B65D 51/16; B65D
51/1611; B65D 51/1616; B65D 51/1622;
B65D 51/1633; B65D 51/1644; B65D
51/1661; B65D 51/1677; B65D 51/1683;
B65D 51/18; B65D 51/185; B65D 51/20;
B65D 51/22; B65D 51/222; B65D
51/226; B65D 51/228; B65D 51/24;
B65D 51/243; B65D 51/245; B65D
51/246; B65D 51/247; B65D 51/249;
B65D 51/28; B65D 51/2807; B65D
51/2814; B65D 51/2821; B65D 51/2828;
B65D 51/2835; B65D 51/2842; B65D
51/285; B65D 51/2857; B65D 51/2864;
B65D 51/2871; B65D 51/2878; B65D
51/2892; B65D 51/30; B65D 51/32;
B65D 53/02; B65D 53/04; B65D 53/06;
B65D 55/02; B65D 55/024; B65D 55/06;
B65D 55/063; B65D 55/16; B65D 59/04;
B65D 61/00; B65D 65/16; B65D 65/403;
B65D 65/42; B65D 65/466; B65D 7/00;
B65D 7/38; B65D 7/46; B65D 71/00;
B65D 71/502; B65D 75/00; B65D
75/008; B65D 75/20; B65D 75/22; B65D
75/30; B65D 75/326; B65D 75/327;
B65D 75/34; B65D 75/525; B65D
75/5805; B65D 75/5822; B65D 75/5827;
B65D 75/5861; B65D 75/5877; B65D
75/5883; B65D 77/00; B65D 77/003;
B65D 77/0413; B65D 77/0486; B65D
77/0493; B65D 77/06; B65D 77/062;
B65D 77/065; B65D 77/067; B65D
77/2028; B65D 77/2032; B65D 77/245;
B65D 77/30; B65D 77/32; B65D 77/38;
B65D 79/0084; B65D 81/00; B65D
81/18; B65D 81/20; B65D 81/2015;
B65D 81/2023; B65D 81/2038; B65D
81/2069; B65D 81/2076; B65D 81/22;
B65D 81/24; B65D 81/245; B65D
81/264; B65D 81/266; B65D 81/32;
B65D 81/3205; B65D 81/3211; B65D
81/3216; B65D 81/3222; B65D 81/3227;
B65D 81/3233; B65D 81/3244; B65D
81/325; B65D 81/3261; B65D 81/3272;
B65D 81/3283; B65D 81/3288; B65D
81/3294; B65D 81/34; B65D 81/3407;
B65D 81/343; B65D 81/3453; B65D
81/365; B65D 81/38; B65D 83/00; B65D
83/0005; B65D 83/0011; B65D 83/0016;
B65D 83/0022; B65D 83/0027; B65D
83/0033; B65D 83/0055; B65D 83/0061;
B65D 83/0083; B65D 83/0094; B65D
83/02; B65D 83/04; B65D 83/0409;
B65D 83/0418; B65D 83/0427; B65D
83/0445; B65D 83/0463; B65D 83/0481;
B65D 83/049; B65D 83/06; B65D 83/08;
B65D 83/0823; B65D 83/0835; B65D
83/0894; B65D 83/12; B65D 83/14;
B65D 83/20; B65D 83/201; B65D
83/202; B65D 83/205; B65D 83/206;
B65D 83/22; B65D 83/24; B65D 83/26;
B65D 83/262; B65D 83/28; B65D
83/285; B65D 83/30; B65D 83/303;
B65D 83/32; B65D 83/345; B65D 83/38;
B65D 83/384; B65D 83/386; B65D
83/388; B65D 83/40; B65D 83/42; B65D
83/425; B65D 83/44; B65D 83/46; B65D
83/48; B65D 83/52; B65D 83/525;
B65D 83/54; B65D 83/546; B65D 83/60;
B65D 83/62; B65D 83/625; B65D 83/64;
B65D 83/66; B65D 83/663; B65D 83/68;
B65D 83/682; B65D 83/70; B65D 83/72;
B65D 83/75; B65D 83/752; B65D 83/756;
B65D 85/00; B65D 85/10; B65D
85/1036; B65D 85/22; B65D 85/36;
B65D 85/50; B65D 85/60; B65D 85/62;
B65D 85/70; B65D 85/72; B65D 85/73;
B65D 85/74; B65D 85/76; B65D 85/78;
B65D 85/804; B65D 85/8043; B65D
85/8046; B65D 85/8049; B65D 85/8052;
B65D 85/8058; B65D 85/8061; B65D
85/816; B65D 85/82; B65D 88/005;
B65D 88/28; B65D 88/60; B65D 88/64;
B65D 88/66; B65D 88/68; B65D 88/72;
B65D 90/00; B65D 90/08; B65D 90/10;
B65D 90/105; B65D 90/22; B65D 90/26;
B65D 90/48; B65D 90/501; B65D 90/54;
B65D 90/587; B65D 90/626; B65D
90/66; G01F 1/00; G01F 1/05; G01F
1/06; G01F 1/07; G01F 1/075; G01F
1/0755; G01F 1/08; G01F 1/115; G01F
1/1155; G01F 1/28; G01F 1/36; G01F
1/375; G01F 1/38; G01F 1/52; G01F
1/662; G01F 1/667; G01F 1/68; G01F
1/684; G01F 1/6847; G01F 1/696; G01F
1/6965; G01F 1/7082; G01F 1/74; G01F
1/80; G01F 1/84; G01F 1/8409; G01F
1/8413; G01F 1/8422; G01F 1/8427;
G01F 1/8468; G01F 1/8477; G01F 1/88;
G01F 11/00; G01F 11/003; G01F 11/006;
G01F 11/02; G01F 11/021; G01F 11/023;
G01F 11/025; G01F 11/028; G01F
11/029; G01F 11/04; G01F 11/06; G01F
11/08; G01F 11/082; G01F 11/084; G01F
11/10; G01F 11/14; G01F 11/16; G01F
11/18; G01F 11/22; G01F 11/24; G01F
11/26; G01F 11/261; G01F 11/262; G01F
11/263; G01F 11/265; G01F 11/268;
G01F 11/28; G01F 11/282; G01F 11/284;
G01F 11/286; G01F 11/288; G01F 11/30;
G01F 11/32; G01F 11/34; G01F 11/36;
G01F 11/38; G01F 11/40; G01F 11/42;
G01F 11/44; G01F 11/46; G01F 13/00;
G01F 13/001; G01F 13/005; G01F
13/006; G01F 13/008; G01F 15/00; G01F
15/001; G01F 15/003; G01F 15/005;
G01F 15/006; G01F 15/007; G01F
15/022; G01F 15/026; G01F 15/046;
G01F 15/06; G01F 15/061; G01F 15/063;
G01F 15/065; G01F 15/066; G01F
15/068; G01F 15/075; G01F 15/0755;
G01F 15/08; G01F 15/10; G01F 15/12;
G01F 15/14; G01F 15/16; G01F 15/18;
G01F 15/185; G01F 19/00; G01F 19/002;
G01F 19/005; G01F 19/007; G01F 22/00;
G01F 22/02; G01F 23/00; G01F 23/0007;
G01F 23/0053; G01F 23/02; G01F 23/04;
G01F 23/14; G01F 23/20; G01F 23/24;

G01F 23/242; G01F 23/26; G01F 23/261;
G01F 23/265; G01F 23/238; G01F
23/284; G01F 23/292; G01F 23/2938;
G01F 23/30; G01F 23/585; G01F 23/64;
G01F 23/665; G01F 23/76; G01F 23/804;
G01F 25/00; G01F 25/0092; G01F 25/10;
G01F 25/11; G01F 25/13; G01F 25/15;
G01F 25/20; G01F 25/24; G01F 3/00;
G01F 3/08; G01F 3/10; G01F 3/12; G01F
3/16; G01F 3/20; G01F 3/22; G01F
3/224; G01F 3/227; G01F 3/228; G01F
3/26; G01F 5/00; G01F 9/003

USPC ... 220/253, 212, 23.83, 23.86, 254.2, 254.3,
220/259.1, 277, 4.06, 4.12, 4.25, 495.07,
220/495.08, 500, 501, 505, 521, 522, 553,
220/565, 567.3, 574.1, 575, 592.2,
220/592.21, 592.26, 608, 613, 62.11, 669,
220/675, 694, 697, 703, 735, 752, 780,
220/784, 831, 832, 87.1, 87.2, 906, 908.2,
220/DIG. 34; 206/5, 7, 1.5, 205, 217,
206/219, 221, 222, 223, 229, 230, 268,
206/368, 37, 438, 459.1, 459.5, 461, 469,
206/484, 508, 509, 524.1, 524.7, 525,
206/528, 530, 531, 532, 533, 534, 534.2,
206/538, 539, 540, 541, 569, 570, 572,
206/63.5, 77.1, 820, 828; 222/1, 107,
222/108, 129, 129.3, 129.4, 132, 135,
222/136, 142.3, 142.9, 144, 144.5, 145.1,
222/145.4, 145.5, 145.6, 146.1, 146.5,
222/148, 153.09, 153.13, 156, 158, 161,
222/162, 164, 165, 166, 167, 168.5, 175,
222/181.1, 181.2, 181.3, 182, 184, 185.1,
222/189.02, 189.03, 189.05, 190, 191,
222/195, 196, 196.1, 196.2, 196.5, 197, 2,
222/200, 201, 205, 207, 212, 215, 218,
222/221, 226, 227, 229, 23, 230, 233,
222/235, 236, 237, 238, 239, 241, 242,
222/243, 283, 284, 29, 294, 30, 305, 306,
222/307, 308, 321.1, 321.7, 323, 324,
222/325, 328, 330, 333, 336, 337, 344,
222/345, 346, 352, 354, 355, 359, 360,
222/361, 362, 363, 364, 366, 367, 368,
222/370, 38, 386.5, 390, 395, 4, 402.2,
222/409, 41, 410, 412, 413, 424.5, 425,
222/427, 429, 43, 430, 436, 437, 438,
222/439, 440, 441, 442, 443, 444, 445,
222/446, 447, 448, 449, 450, 451, 452,
222/453, 454, 455, 456, 457, 457.5, 46,
222/460, 461, 464.1, 465.1, 47, 470, 472,
222/473, 474, 475, 476, 478, 48, 480,
222/481, 482, 499, 500, 501, 502, 504,
222/506, 509, 510, 517, 518, 52, 523,
222/525, 528, 530, 535, 538, 539, 541.1,
222/541.5, 544, 545, 546, 547, 548, 55,
222/553, 555, 556, 557, 559, 56, 561,
222/562, 564, 565, 566, 567, 571, 574,
222/575, 58, 63, 630, 636, 639, 64, 640,
222/644, 651, 67, 71, 77, 81, 88, DIG. 1;
426/231, 237, 455, 463, 471, 506, 519,
426/548, 573, 577, 583, 588, 590, 61,
426/622, 656, 658, 71, 72

See application file for complete search history.

(56) References Cited

U.S. PATENT DOCUMENTS

| | | | | |
|---|---|---|---|---|
| 2007/0000953 | A1* | 1/2007 | Ranney | G01F 11/46 222/438 |
| 2007/0194056 | A1* | 8/2007 | Webster | G01F 11/46 222/333 |
| 2013/0062347 | A1* | 3/2013 | Webster | G01F 11/46 220/253 |
| 2014/0144926 | A1* | 5/2014 | Wolf | A47J 47/01 222/241 |
| 2014/0203050 | A1* | 7/2014 | Blackburn | G01F 11/261 29/428 |
| 2015/0041500 | A1* | 2/2015 | Ismail | G01F 11/268 222/452 |
| 2016/0123786 | A1* | 5/2016 | Hanna | B65D 83/06 220/254.2 |
| 2018/0132652 | A1* | 5/2018 | LaFosse | A47J 31/404 |
| 2018/0327174 | A1* | 11/2018 | Daniels, Jr. | B65D 25/20 |
| 2021/0139205 | A1* | 5/2021 | Fratantoni | B65D 83/06 |

* cited by examiner

LID FOR DISPENSING MEASURED POWDER AMOUNTS

CROSS-REFERENCE TO RELATED APPLICATION

This application claims the benefit of priority of U.S. provisional application No. 63/331,062, filed 14 Apr. 2022, the contents of which are herein incorporated by reference.

BACKGROUND OF THE INVENTION

The present invention relates to apparatus and methods of dispensing measured powder amounts and, more particularly, to a lid assembly for dispensing measured powder amounts, wherein the lid assembly may be used to improve a preexisting container.

Powder health products such as protein powders are often supplied in containers that include a scoop for measuring out the needed serving quantity. These scoops are often difficult to find inside containers filled with powder. The user is further inconvenienced by sticking their hand into the container to scoop out the needed amount of powder. In this process, the user must touch the powder and potentially create a mess by not adjusting the amount and hitting the scoop around the container.

Current solutions are typically multi-compartment and/or are set up for a permanently inverted position of the container for dispensing. They are poorly sealed which can allow moisture intrusion into the powder. Moisture intrusion (e.g., humidity) can ruin powders. Furthermore, the poor sealing across sliding members can allow powder to escape. Allowing powder to escape and cake the outside can also lead to issues of poor cleanliness.

As can be seen, there is a need for a lid assembly for dispensing measured powder amounts without having to open the jar to pull a scoop out therefrom.

SUMMARY OF THE INVENTION

The present invention can be used with existing containers and maintains complete hermetic sealing of the powder within the container/compartment.

The present invention resolves these inconveniences by using a specialized container lid with an external measuring compartment integrated to the lid portion and in the form of a spout. An axially rotatable lever arm is used to actuate a diaphragm that is movable between an open configuration and a closed configuration, opening and closing the measuring compartment from the inside to allow entry of the powder into the integrated external measuring spout compartment and then be retained therein, respectively. The measuring spout compartment includes a cap that holds the powder in place while the lever is then closed to keep the powder within the measuring spout compartment. The user can then remove the cap to allow the serving of the powder from the measuring spout compartment of the lid portion.

The dispensing lid assembly includes a fully internal wiper arm or diaphragm that opens and closes powder entry into the compartment. This wiper arm/diaphragm is axially rotated by an external full perimeter member. Rotating this external member will allow measured powder dispensing into the compartment.

The external member can then be rotated to close off the compartment in preparation for discharge. A sealed cap for the compartment can be opened when the container is ready to discharge from the compartment.

In one aspect of the present invention includes the following: a lid portion dimensioned and adapted to seal an opening of a container, the lid portion having the following: a measuring spout mechanically communicating to a lid of the lid portion, wherein the measuring spout extends away from the container during use; and an aperture formed in the lid, the aperture fluidly connecting the measuring spout with the container during use; and a dial portion operatively associable with the lid portion so as to rotate relative the lid portion, the dial portion having a diaphragm mechanically communicating with the dial portion so as to rotatably move in concert therewith between an open configuration and a closed configuration fluidly disconnecting the aperture with the container during use, wherein the lid is disposed between the diaphragm and the dial portion during use.

In another aspect of the present invention the lid assembly further includes the following: a rotatable arm fixed to and radially extending from a periphery of the dial portion to a center of the lid, and wherein a distal end of the rotatable arm operative associates with the diaphragm; an interface void centrally disposed in the lid; and a diaphragm interface extending from the distal end of the rotatable arm, through the interface void, and to an arm interface operatively associated with the diaphragm, wherein the lid, during use, seals the opening of the container but for the interface void and the aperture, wherein, during use, the diaphragm interface seals the interface void; a first sidewall depending from a periphery of the dial portion, wherein the first sidewall operatively associates with a rim of the opening of the container during use; and a second sidewall depending from the periphery of the dial portion, wherein the second sidewall is rotatably associated with an external surface of the first sidewall; a pouring opening on the measuring spouts; and a cap that is movable between an unsealed condition and a sealed condition sealing off the pouring opening.

In yet another aspect of the present invention a lid assembly includes the following: a lid portion having: a measuring spout mechanically communicating with and extends substantially perpendicular from to a lid of the lid portion; and an aperture formed in the lid to substantially fluidly communicated with a measuring volume defined by the measuring spout; and a dial portion operatively associable with the lid portion so as to rotate relative the lid portion, the dial portion having: a diaphragm mechanically communicating with the dial portion so as to rotatably move in concert therewith between an open configuration and a closed configuration fluidly decoupling the aperture and the measuring volume, wherein the lid is disposed between the diaphragm and the dial portion; and a pouring opening on the measuring spouts; and a cap that is movable between an unsealed condition and a sealed condition sealing off the pouring opening.

In still yet another aspect of the present invention a method of improving dispensing powder from a container includes operatively associating the above-mentioned lid assembly with an opening of the container; inverting, in the open configuration and in the sealed condition, the container; rotating the dial portion until the diaphragm moves to the closed configuration; and moving the cap to the unsealed condition.

These and other features, aspects and advantages of the present invention will become better understood with reference to the following drawings, description and claims.

DETAILED DESCRIPTION OF THE INVENTION

Figure 1:
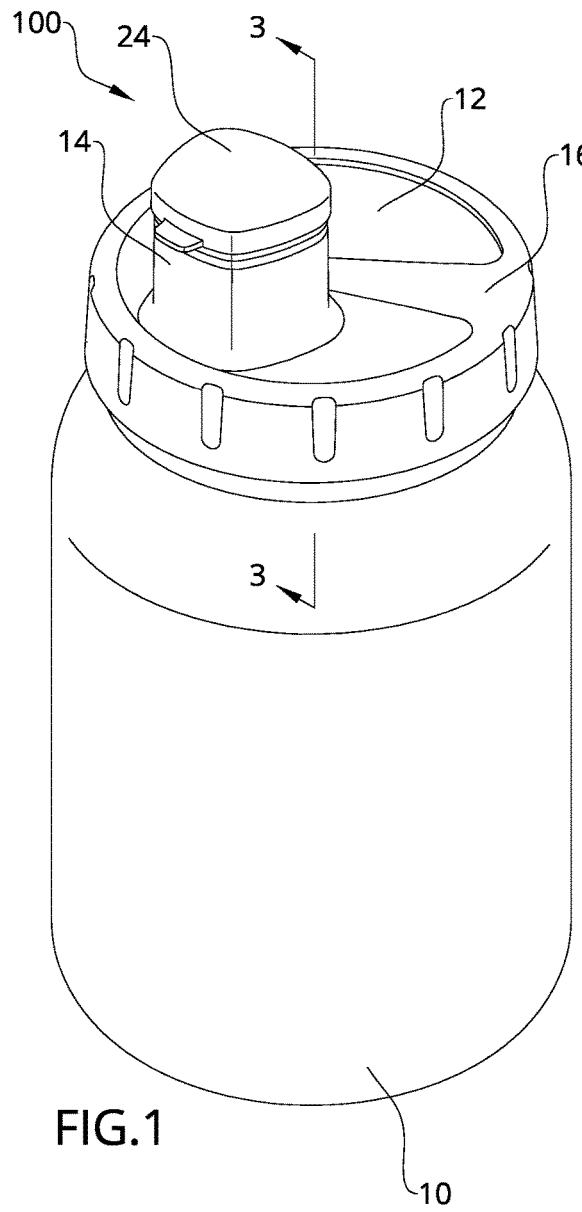
FIG. 1 is a top perspective view of an exemplary embodiment of the present invention.
Figure 2:
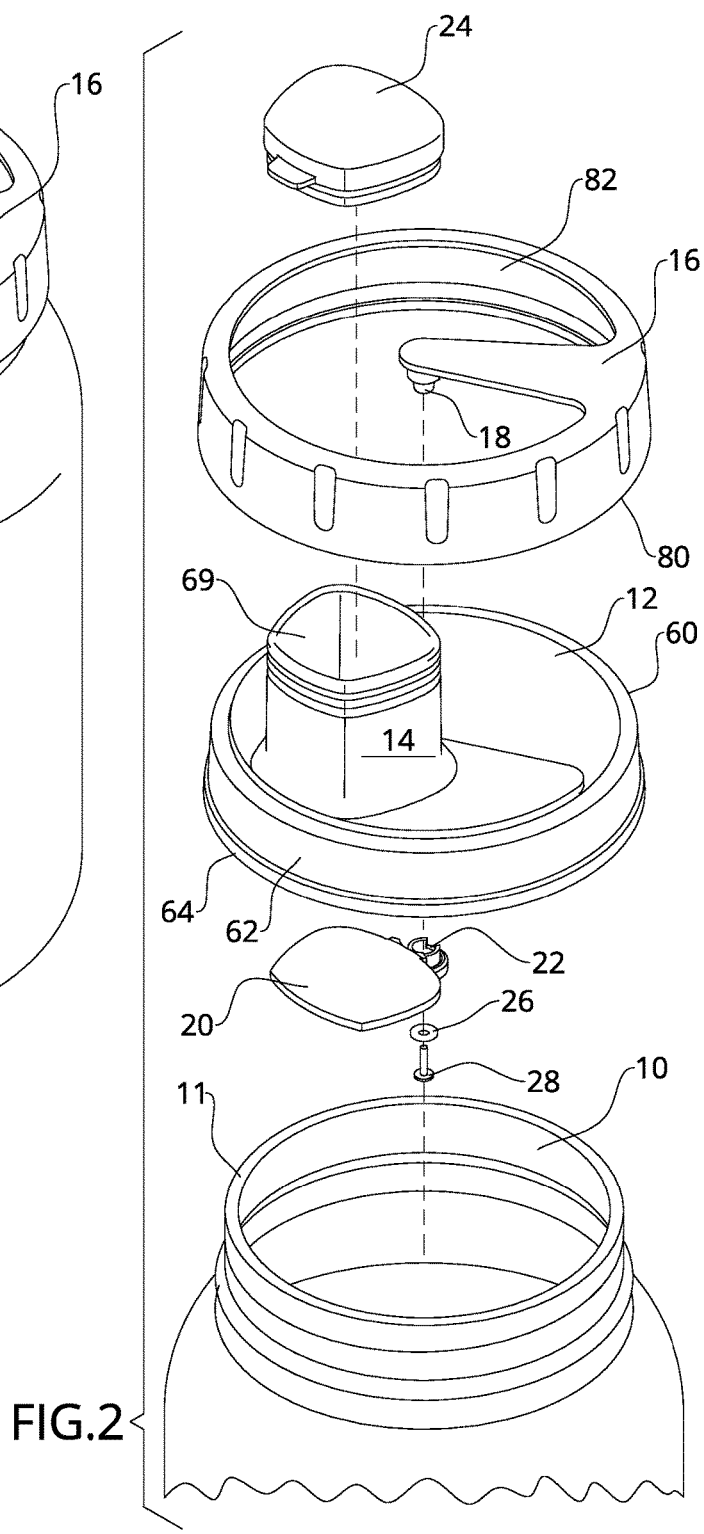
FIG. 2 is a top perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a dispensing lid assembly having a lid portion that seals off the opening of the container but for an aperture and a centrally disposed interface void. The lid portion provides an integrated, external measuring spout in communication with the aperture. A dial portion may be rotatably coupled to the lid portion so that they rotate independent of each other. The dial portion is operatively associated with a diaphragm disposed under the lid portion so that rotation of the dial portion selectively moves the diaphragm between an open configuration and a closed configuration closing off the aperture and fluidly disconnecting the compartment of the container from the external measuring spout. Note, there may be a plurality of open configurations, including where the diaphragm only partially closes of the aperture.

Referring to FIGS. 1 through 5, the present invention may include dispensing lid assembly 100. The dispensing lid assembly 100 may include a lid portion 60 and a dial portion 80 that operatively associates along a rim 11 of a container 10.

The lid portion 60 may have a lid 12 with an annular sidewall 62 that extend substantially perpendicularly form a periphery of the lid 12. The annular sidewall 62 is dimensioned and adapted to cooperatively engage the rim 11 to form a liquid-tight and/or hermetic seal thereto. The annular sidewall 62 may provide outward and/or inward facing mating threads 64/65. The lid 12 may be solid but for an aperture 66 and an interface void 67. The aperture 66 communicates with a measuring spout 14. The measuring spout 14 defines a measuring compartment 68 that fluidly communicates with the aperture 66. On the opposite end of the measuring spout 14 is an opening 69 for dispensing that fluidly communicates with the external environment. A cap 24 may be dimensioned and adapted to cover the opening 69, forming a hermetical seal. The cap 24 may be mechanically connected to the measuring spout 14 by a connector 25. The measuring spout 14 may be disposed off center, relative to the lid 12, to facilitate pouring from the measuring spout 14. The interface void 67 is centrally located in the lid 12.

The dial portion 80 may have an annular sidewall 82 that operatively associates with sidewall 62 of the lid portion 60 so that the dial portion 80 can rotate relative to the lid portion 60 without lessening the lid portion's threaded engagement of the rim 11. The dial portion 80 provides a rotatable arm 16 that radially extending from the annular sidewall 82. Along an underside of a distal end of the rotatable arm 16 is a downward directed diaphragm interface 18 that nests in the interface void 67 of the lid portion 60.

Figure 3:
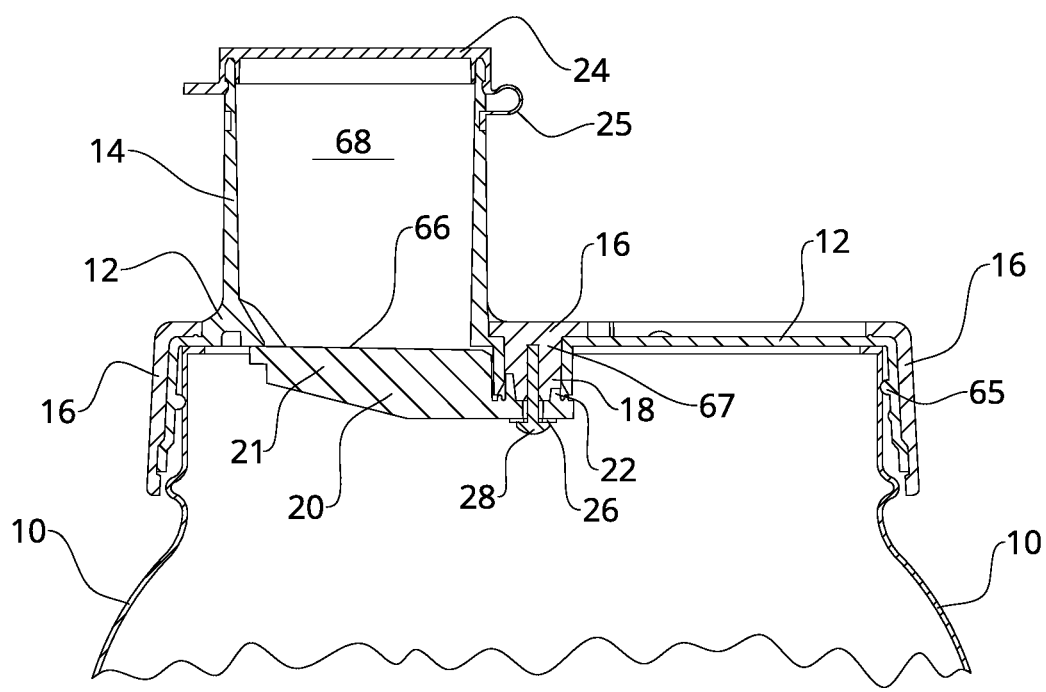
FIG. 3 is a detailed section view of an exemplary embodiment of the present invention, taken along line 3-3 of FIG. 1.
Figure 4:
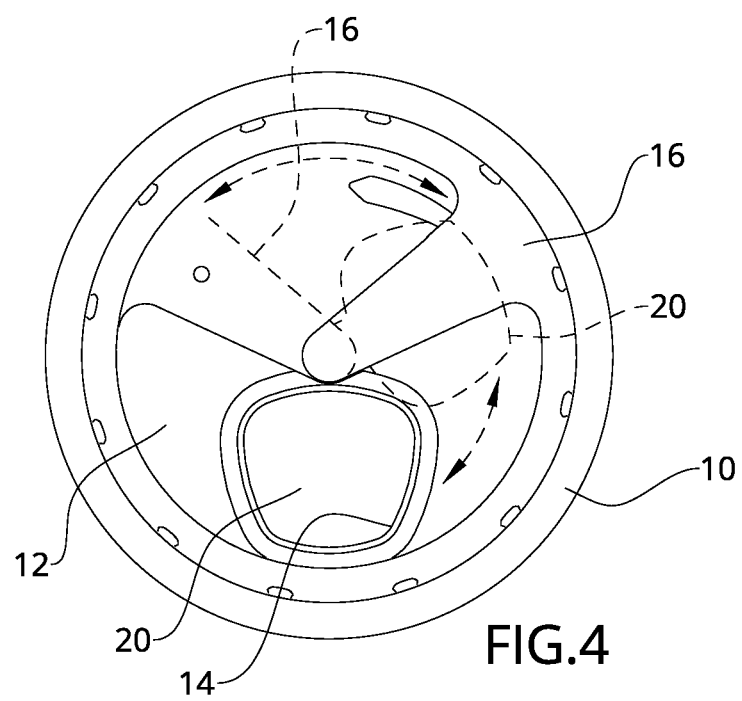
FIG. 4 is a top plan view of an exemplary embodiment of the present invention.
Figure 5:
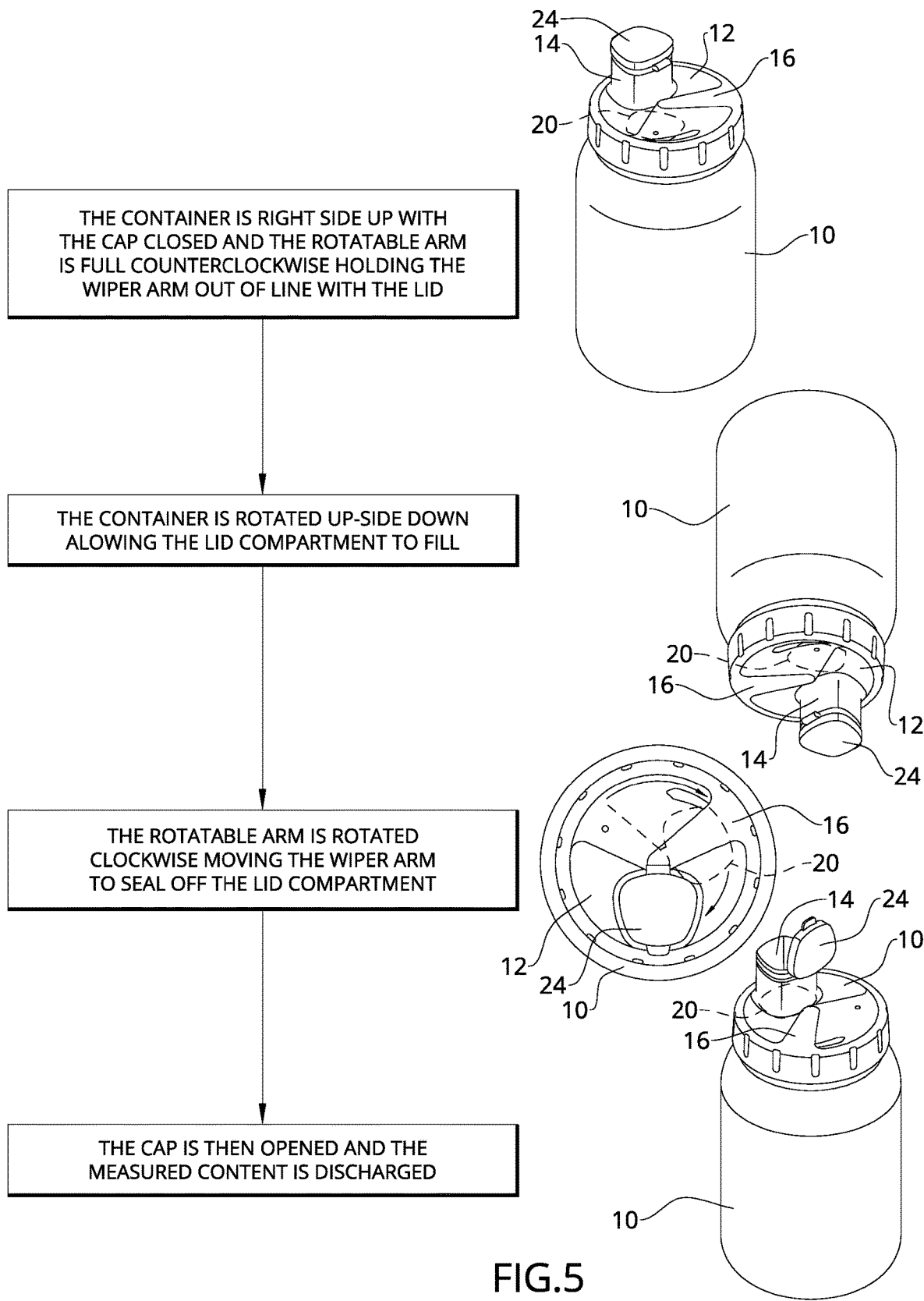
FIG. 5 is a flow chart of an exemplary embodiment of the present invention, wherein each step has an associated illustrative drawing.

A diaphragm 20, downward of the lid portion 60, is dimensioned and adapted to be at least coextensive with the aperture 66. The diaphragm 20 provides an arm interface 22 operatively associates with the diaphragm interface 18 so that as one turns the rotatable arm 16 (by way of turning the annular sidewall 82, for instance) the diaphragm 20 rotates about the axis defined by the diaphragm and arm interfaces 18 and 22, like the hand of a clock. Fasteners 26 and 28, such as washers and screws, may facilitate the rotatable connection. Accordingly, the diaphragm 20 may be selectively rotated from an open configuration (where the diaphragm 20 and the aperture 66 are mutually exclusive) and a closed configuration where the diaphragm 20 is at least coextensive with the aperture 66 fluidly disconnecting the measuring compartment 68 from the container 10. The diaphragm may have a central stiffening rib 21, as seen in FIG. 3.

The following steps are performed to dispense a measured amount of powder. The container 10, while right side up with the diaphragm 20 in the open configuration, is rotated up-side down allowing powder to enter the measuring compartment 68. Then, while the container 10 is upside down, the rotatable arm 16 is rotated so that the diaphragm 20 moves to the closed configuration. In some embodiments, clockwise rotation is preferred to ensure the lid portion 60 will remain tightly threaded to 11 while the assembly is in the upside-down position. This encases the powder within the measuring compartment 68. Finally, the spout cap 24 can then be opened to allow the powder to discharge for serving the measured amount afforded by the measuring compartment 68 having a predetermined volume.

The lid assembly (elements 2 to 6) can be assembled using the following process: The lid rotatable arm 16 may be attached over the lid portion 60 and penetrates the lid 12 through a central interface void 67 (radially sealed by an O-ring, lip seal, or the like). The keyed diaphragm 20 may be screwed to the rotatable arm 16 from the inside.

The invention allows customers to replace their existing container lids with the dispensing lid assembly 100 described herein. This will allow the customer a measured dispensing of the powder within the container 10 without the need to open the lid and search for a scoop within the powder. The present invention enables measured dispensing of non-powdered items such as dried ingredients used in cooking.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A lid assembly for a container, the lid assembly comprising:
   a lid portion dimensioned and adapted to seal an opening of the container, the lid portion comprising:
      a measuring spout mechanically communicating to a lid of the lid portion, wherein the measuring spout extends away from the container during use; and
      an aperture formed in the lid, the aperture fluidly connecting the measuring spout with the container during use; and
   a dial portion operatively associable with the lid portion so as to rotate relative the lid portion, the dial portion comprising:
      a rotatable arm fixed to and radially extending from a periphery of the dial portion to a center of the lid portion;
      a diaphragm mechanically communicating with a distal end of the rotatable arm so as to rotatably move in concert therewith between an open configuration and a closed configuration fluidly disconnecting the aperture with the container during use, wherein the lid is disposed between the diaphragm and the rotatable arm during use; and
      a measuring compartment defined by a portion of the measuring spout that protrudes through and beyond the dial portion, wherein the measuring compartment defines a predetermined volume, and wherein the measuring compartment is substantially external relative to the dial portion.

2. The lid assembly of claim 1, further comprising:
   an interface void centrally disposed in the lid; and
   a diaphragm interface extending from the distal end of the rotatable arm, through the interface void, and to an arm interface operatively associated with the diaphragm.

3. The lid assembly of claim 2, wherein the lid, during use, seals the opening of the container but for the interface void and the aperture.

4. The lid assembly of claim 3, wherein, during use, the diaphragm interface seals the interface void.

5. The lid assembly of claim 4, further comprising:
   a first sidewall depending from a periphery of the lid portion, wherein the first sidewall operatively associates with a rim of the opening of the container during use; and
   a second sidewall depending from the periphery of the dial portion, wherein the second sidewall is rotatably associated with an external surface of the first sidewall.

6. The lid assembly of claim 5, further comprising a pouring opening at a distal end of the measuring spout; and
   a cap that is movable between an unsealed condition and a sealed condition sealing off the pouring opening.

7. A lid assembly, comprising:
   a lid portion comprising:
      a measuring spout mechanically communicating with and extends substantially perpendicular from a lid of the lid portion; and
      an aperture formed in the lid, the aperture fluidly communicating with a measuring volume defined by the measuring spout; and
   a dial portion operatively associable with an exterior surface of the lid portion so as to rotate relative the lid portion, the dial portion comprising:
      a rotatable arm fixed to and radially extending from a periphery of the dial portion to a center of the lid portion; and
      a diaphragm mechanically communicating with a distal end of the rotatable arm so as to rotatably move in concert therewith between an open configuration and a closed configuration fluidly decoupling the aperture and the measuring volume, wherein the lid is disposed between the diaphragm and the rotatable arm,
   wherein the measuring spout protrudes through and beyond the dial portion, wherein the measuring compartment defines a predetermined volume, and wherein the measuring compartment is substantially external relative to the dial portion.

8. The lid assembly of claim 7, further comprising a pouring opening at a distal end of the measuring spout; and
   a cap that is movable between an unsealed condition and a sealed condition sealing off the pouring opening.

9. A method of improving dispensing powder from a container, the method comprising:
   operatively associating the lid assembly of claim 8 with an opening of the container;
   inverting, in the open configuration and in the sealed condition, the container;
   rotating the dial portion until the diaphragm moves to the closed configuration; and
   moving the cap to the unsealed condition.

10. The lid assembly of claim 5, wherein the second sidewall directly engages an exterior surface of the first sidewall.

11. The lid assembly of claim 10, further comprising a dial shoulder generally coplanar with the rotatable arm, wherein the dial shoulder extending radially inward from the second sidewall so that the dial shoulder is seated on the lid.

12. The lid assembly of claim 11, wherein the arm interface and the diaphragm interface define an axis of rotation of the diaphragm, further comprising a fastener connected from the underside of the diaphragm, wherein the fastener enables the rotatable movement.

13. The lid assembly of claim 12, wherein the diaphragm has central stiffening rib.

* * * * *